United States Patent [19]

Houston

[11] 4,047,039

[45] Sept. 6, 1977

[54] TWO-DIMENSIONAL X-RAY DETECTOR ARRAY

[75] Inventor: John M. Houston, Schenectady, N.Y.

[73] Assignee: General Electric Company, Schenectady, N.Y.

[21] Appl. No.: 692,287

[22] Filed: June 3, 1976

[51] Int. Cl.[2] .................... G01T 1/18

[52] U.S. Cl. .................... 250/385; 250/374; 313/93

[58] Field of Search .................... 250/374, 375, 385, 366; 313/93

[56] References Cited

U.S. PATENT DOCUMENTS

| | | | |
|---|---|---|---|
| 3,509,339 | 4/1970 | Doehner | 250/366 |
| 3,609,435 | 9/1971 | Taylor et al. | 250/385 X |
| 3,884,817 | 5/1975 | Jilbert | 250/385 |
| 3,991,312 | 11/1976 | Whetten et al. | 250/385 |

*Primary Examiner*—Archie R. Borchelt
*Attorney, Agent, or Firm*—Jack E. Haken; Joseph T. Cohen; Jerome C. Squillaro

[57] ABSTRACT

A two-dimensional array of ionization chamber x-ray detector cells comprises a plurality of planar anode assemblies disposed equi-distant between parallel cathode plates in a gas of high atomic number. Each anode assembly comprises a plurality of conductive strips disposed on a thin dielectric sheet in a direction substantially parallel to the incident x-ray energy.

18 Claims, 5 Drawing Figures

*Fig. 2*
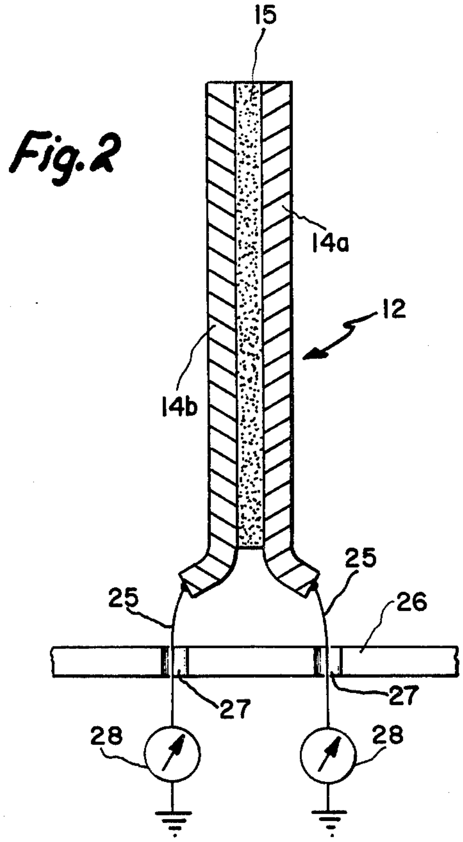
*Fig. 3*
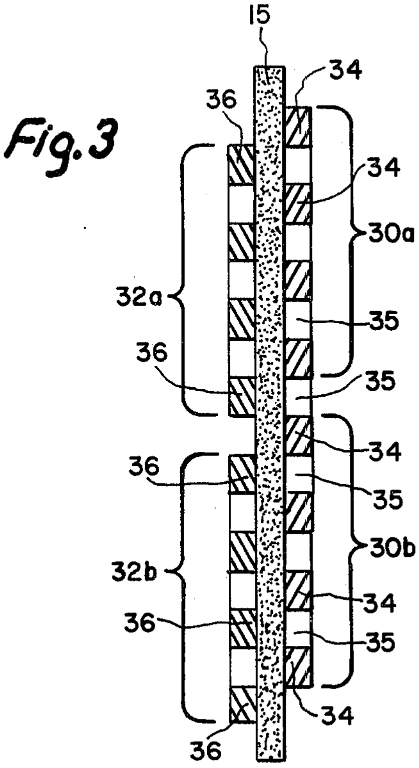
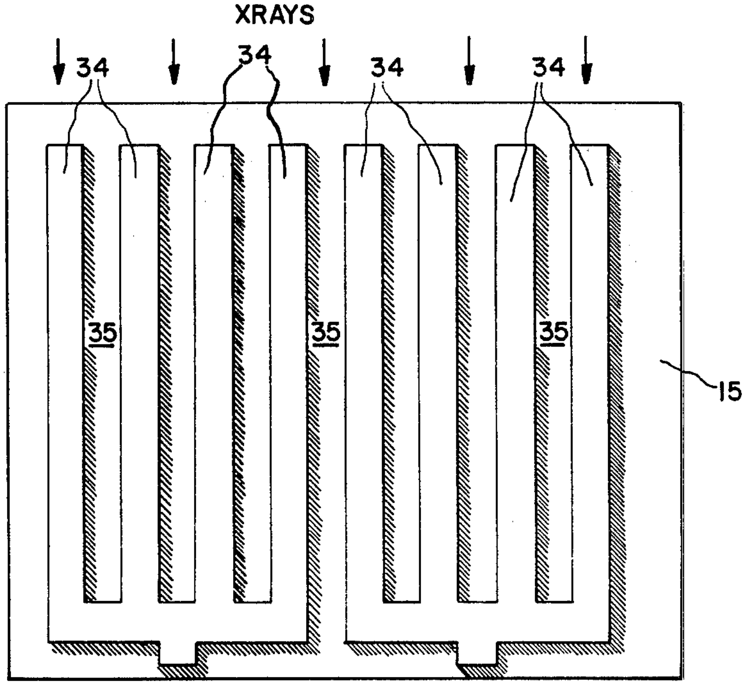
*Fig. 4*

TWO-DIMENSIONAL X-RAY DETECTOR ARRAY

BACKGROUND OF THE INVENTION

This invention relates to ionization chamber, x-ray detectors. More specifically, this invention relates to multi-cellular x-ray detectors which comprise two-dimensional arrays of high pressure ion chambers for use in computerized tomography systems.

In computerized x-ray tomography a spatial distribution of x-ray intensity must be translated into electrical signals which are processed to yield image information. Detectors for use in such systems must efficiently detect x-ray, electromagnetic energy with a high degree of spatial resolution. The information rate in tomography systems is generally limited by the recovery time of the x-ray detectors. It is desirable, therefore, to utilize x-ray detectors characterized by fast recovery times, high sensitivity, and fine spatial resolution. Proposed tomography systems employ arrays of hundreds of such x-ray detectors. A multicellular construction, wherein multiple, spatially separated x-ray detection cells are incorporated in a single assembly, provides an economic means for the production of such systems.

Arrays of ionization chambers are typically used to measure the distribution of intensity in computerized transverse axial tomography equipment. In a typical application of such equipment, a moving x-ray source is repeatedly pulsed to transmit x-ray energy along a plurality of distinct coplanar ray paths which pass through a body undergoing examination. Energy transmitted through the body is detected in an ionization chamber array and interpreted, by the use of a digital computer, to produce cross-sectional images of the internal body structures in the plane of examination. A typical tomographic diagnostic procedure involves the production of images in a series of closely spaced, substantially parallel planes passing through a region of the body. Successive scans may be accomplished by translating either the patient or the x-ray equipment along an axis passing through the body. A three-dimensional reconstruction of internal body structures may, thus, be determined from the set of images produced.

The rate of production of tomographic images in such systems is necessarily limited by the time required to accomplish the physical rotation and translation of the mechanism. Typically, one second or more is required to accumulate the data necessary to produce an image in a single plane. Reconstructions of large body regions will, therefore, often be confused by movement of the patient, or of his internal body organs, during the course of an examination procedure.

SUMMARY OF THE INVENTION

In accordance with the present invention, x-ray electromagnetic radiation is detected in a high pressure gas of high atomic weight. X-ray photons interact with the gas to produce photelectron-ion pairs in the presence of an electric field. The electrons thus produced are collected on a two-dimensional array of positively charged electrodes to produce electric currents which vary in proportion to the x-ray intensity in the vicinity of those electrodes. An embodiment of the present invention comprises a linear array of ionization chamber cells wherein each cell comprises a flat planar electrode array of the opposite polarity. The x-ray intensity distribution along a number of parallel lines may thus be simultaneously measured.

In a computerized tomography system, the detector array of the present invention may be used simultaneously to record x-ray transmission data in a number of parallel planes. Data for two or more tomographic images may thus be produced in parallel. The time required for a whole body tomographic examination and the distorting effects of patient movement are thereby reduced.

It is, therefore, an object of this invention to reduce the time required for tomographic examinations.

Another object of this invention is to reduce the distortion of tomographic images which is produced by motion of body organs during a scan procedure.

A third object of this invention is to reduce the number of discrete parts required per detection cell in the detector array.

BRIEF DESCRIPTION OF THE DRAWINGS

The novel features believed characteristics of the present invention are set forth in the appended claims. The invention itself, together with further objects and advantages thereof, may best be understood with reference to the following detailed description taken in connection with the appended drawings in which:

FIG. 2 is a top sectional view of a collector electrode used in the array of FIG. 1;

FIGS. 3 and 4 are alternate embodiments of a collector electrode which provides low interelectrode capacitance.

DESCRIPTION OF THE PREFERRED EMBODIMENTS

Figure 1:
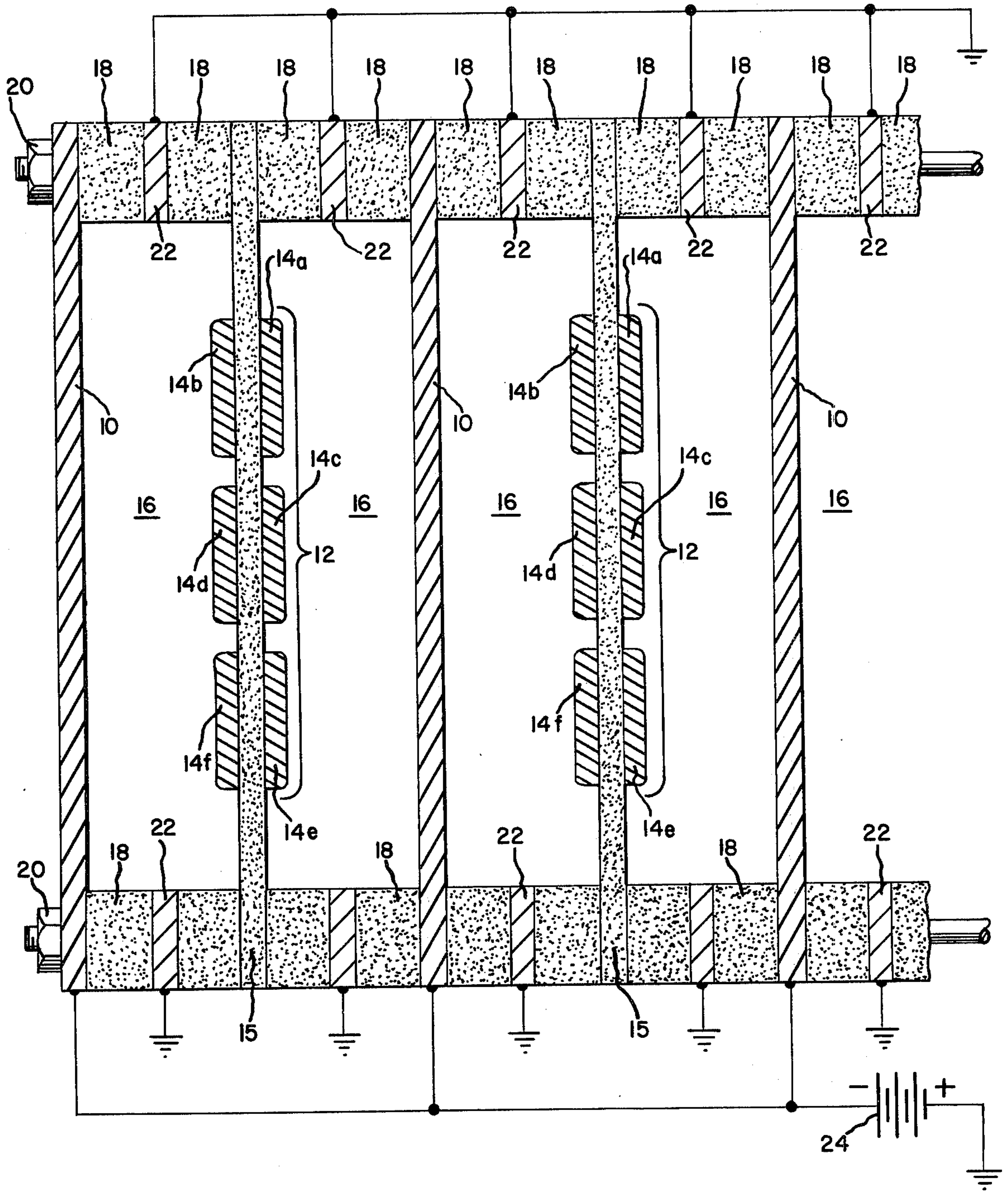
FIG. 1 is an ionization chamber array of the present invention.

X-ray photons will interact with atoms of a heavy detector gas to produce electron-ion pairs. The x-ray photons are, generally absorbed by a gas atom which emits a photoelectron from one of its electronic levels. The photoelectrons move through the gas interacting with and ionizing other gas atoms to produce a shower of electrons and positive ions which may be collected on suitable electrodes to produce an electric current flow. If, for example, xenon gas at approximately 10 atmospheres pressure is irradiated with 60 KEV x-ray photons, photoelectrons will be ejected from the 34.5 KEV xenon k shell at approximately 25.5 KEV. The 25.5 KEV photoelectrons, having a range of approximately 0.1 mm in the xenon, will produce approximately 800 electron-ion pairs each. If these electron-ion pairs are produced in a region between two electrodes of opposite polarity, they will drift along electric field lines to the electrodes and yield a net electric current flow between them. The electric current flow between the electrodes is thus a function of the total number of x-ray photons interacting in the vicinity of those electrodes.

The probability of detection of an x-ray photon is a function of the atomic number of the gas and the number of gas atoms lying between the collector electrodes. Thus, high sensitivity detectors may be constructed from a gas of high atomic weight at a relatively high pressure. Detector sensitivity may also be increased by increasing the spacing, and therefore the number of gas molecules, between the electrodes. Increased electrode spacing, however, increases the distance the electron-ion pairs must drift for collection and thus tends to increase the recovery time of the detector. An increased electric field gradient between the electrodes will tend to increase the electron-ion drift velocity and thus shorten the detector recovery time. Furthermore, it is well known that an excessive electric field gradient will cause avalanche gas breakdown and will create highly nonlinear responses in detection sensitivity.

The detectors of the present invention operate with electric field gradients which are insufficient to cause electron multiplication: that is, they may be characterized as ionization chambers and not as proportional counters. The production of electron-ion pairs described above is attributable solely to energy transfer from the ejected k-shell photoelectrons and is not caused by collisions of electrons or ions moving under the influence of the impressed electric field. The values of electric field gradients which are suitable for use in ionization chamber detectors are well known in the art and are more fully described in *Medical Radiation Physics*, W. R. Hendee, Year Book Medical Publishers, Chicago, at chapters 4 and 17. The detectors of the present invention operate with electric field gradients between approximately 10 v/mm and approximately 1000 v/mm.

An l-shell electron will generally drop to fill the opening which is produced by the emission of the k shell photoelectron from a heavy atom. The energy difference resulting from the drop of the electron from the l to the k shell levels is radiated in the form of a secondary x-ray photon. In xenon gas, for example, the l to k energy level shift produces 29 KEV x-ray photons. The range of these secondary photons in a high pressure gas is generally much larger than the range of photoelectrons. By way of example, in xenon at 10 atmospheres pressure 25.5 KEV photoelectrons have a range of approximately 0.1 mm while 29 KEV x-ray photons have a range of approximately 20 mm.

Secondary photons which are produced by the fluorescence of the heavy gas atoms upon excitation by incident x-ray photons are absorbed by other heavy gas molecules in the detector and are indistinquishable from incident x-ray photons. Thus, photons which are produced by fluorescence in the region of one electrode cell may travel through a multicell detector to the region of another electrode cell where they will be detected in the same manner as incident x-rays. The k-shell fluorescence effect may, therefore, be seen to contribute to the degradation of spatial resolution in multicell, ionization chamber detectors.

FIG. 1 illustrates an embodiment of a multicell, x-ray detector of the present invention. A pressure vessel (not shown) contains a detector gas 16 at high pressure. One side of the pressure vessel defines a thin window which is substantially transparent to the electromagnetic radiation at x-ray frequencies. The window may be constructed from any of the materials which are well known and commonly used for that purpose in the radiation detection arts; for example, aluminum, plastic resin, or a matrix of plastic resin reinforced by low atomic number metals. The term "substantially transparent", as used herein means that the probability of x-ray radiation interacting with the window material is much less than the probability of that x-ray radiation interacting with the detector gas 16. In the illustration of FIG. 1, x-ray radiation enters the detector array in a direction which is substantially perpendicular to the plane of the drawing.

The detector gas 16 fills the pressure vessel and is chosen to be substantially opaque to electromagnetic radiation at x-ray frequencies. As used herein, the term "substantially opaque" means that the probability of x-ray radiation interacting with the detector gas 16 is much greater than the probability of that electromagnetic radiation interacting with the window. The gas type, gas pressure, and electrode spacing are chosen using methoods well known to the art so that a large fraction (typically more than 70 percent) of the incident x-ray photons are absorbed within the gas. The detector gas 16 may, typically, comprise a rare gas of high atomic number, for example, xenon, argon, or a molecular gas comprising atoms having an atomic weight greater than that of argon (i.e., 39.9); at a pressure from approximately 10 atmospheres to approximately 100 atmospheres.

A plurality of planar cathodes 10 are disposed in the gas 16 within the pressure vessel. A plurality of segmented anode assemblies 12 (more particularly described below) are disposed equi-distant between the cathodes 10. The cathodes 10 and the anode assemblies 12 are supported by bolts 20 and separated by insulators 18. Grounded guard rings 22 may be inserted, if desired, into the insulators 18 between the cathodes 10 and the anode assemblies 12 to drain currents which might otherwise flow along the insulators and introduce measurement errors. The cathode structures 10 are maintained at a negative voltage with respect to ground by a voltage source 24.

The electrodes in the descriptions of the preferred embodiments of the present invention have, for ease of description, been referred to as "cathodes" and "anodes." It is to be understood, however, that the polarity of the electric potentials applied to these detectors may be reversed without affecting the principles of operation of the disclosed invention and that the anode structures may be operated at an applied potential which is negative with respect to the cathode potential. The terms cathode and anode, as used herein and in the appended claims, mean electrodes of opposite polarity.

The anode assemblies 12 each comprise a plurality of separate strip-like anode elements **14*a* through 14*f* disposed on the surfaces of a thin dielectric sheet 15 in a direction substantially parallel to the direction of the incident x-ray beam. Individual anode elements are arranged in groups along planes lying perpendicular to the cathode plates 10 and the dielectric sheets 15. Thus, anode elements 14*a* and 14*b* define a first plane through the array while anode elements 14*c* and 14*d* define a second plane and anode elements 14*e* and 14*f* define a third plane. Any number of anode elements may be incorporated in an array to define a large number of separate detector planes. However, limitations imposed by the x-ray source intensity, the cost of the electronic circuitry, and the resolution limiting effects of x-ray fluorescence will generally limit the number of planes in a practical detector to two or three. The anode elements 14*a*, 14*c*, and 14*e* of FIG. 1 comprise the anode structure for a single detector cell while the anode elements 14*b*, 14*d*, and 14*f* comprise the anode elements for an adjacent cell. The number of individual parts and the complexity of the detector array are, however, substantially reduced by affixing the elements 14*a* through 14*f*** on a single dielectric sheet may typically comprise mica, silicone resin reinforced with glass fiber, or any other material which is commonly used for that purpose in the detector arts.

FIG. 2 is a sectional view through an anode assembly 12. The individual anode element strips 14*a* and 14*b* are connected to wire leads 25 which pass through the back wall of the pressure vessel 26 in insulating bushings 27. Each individual anode segment 14*a* through 14*f* is connected to ground through a current measuring circuit 28. The current measuring circuits 28 are, typically, located outside the pressure vessel and may comprise electronic circuits which convert the current flow from the anode segments into signals which may be utilized and processed in a digital computer.

The cathode plates 10 are constructed from metals which are substantially opaque to electromagnetic radiation at x-ray frequencies. Metals of high atomic number, for example, molybdenum, tantalum, or tungsten, are suitable for use as the cathodes. By way of illustration only, in a typical detector the cathode plates are constructed from 0.05 mm molybdenum or tungsten sheets.

Photons of x-ray radiation enter the detector through the window in directions substantially parallel to the anode assemblies 12 and the cathode plates 10. The photons interact with the gas 16 in the regions between the anode assemblies 12 and the cathode plates 10. Electron-ion pairs which are produced by interaction of the gas 16 with the photon drift along electric field lines between the anode elements and cathodes are collected thereon to produce electric current signals. The electric current flowing from a particular anode element 14*a*-*14f* is proportional to the number of x-ray photons interacting with the gas 16 in the space between that anode and the adjacent cathode 12.

This detector is relatively insensitive to the resolution limiting effects of k-band, x-ray fluorescence. Any x-ray photons which are produced by fluorescence in the region between an anode assembly 12 and a cathode 10 must pass through a cathode plate 10 before they would be capable of producing electron-ion pairs which would drift to an adjacent anode assembly. As indicated above, the cathode plates 10 are constructed from material which is substantially opaque to x-ray photons and the incidence of fluorescent x-ray photons with sufficient range to produce current in adjacent cells is thereby greatly reduced. The anode assemblies 12 and cathode structures 10 of the present embodiment lie parallel to the direction of photon incidence. The plates of the anodes 15 and the cathodes 10 may, therefore, be spaced relatively close together yielding a detector with a short recovery time, while the length of the plates may be increased to produce a detector of high sensitivity. By way of illustration only, in a typical detector, the anode assemblies 12 and cathode plates 10 are mounted on 2 mm centers. The parallel cathode plates of this detector embodiment also serve to absorb incident photons which are scattered from external objects (i.e., tissue under examination) and which enter the detector at an oblique angle.

The individual anode elements 14*a*-*14f* of the anode assembly 12 are arrayed on opposite sides of a thin dielectric sheet 15. Considerable electrical capacitance therefore exists between paired electrode elements (i.e., 14*a* and 14*b*) on opposite sides of the dielectric sheet 15. This additional capacitance may tend to load or otherwise interfere with integrating circuits and preamplifiers which are typically incorporated in current measuring circuits 28 and thus may tend to slow the response time of those circuits. FIGS. 3 and 4 are in an alternate anode assembly (12) embodiment which provides decreased interelectrode capacitance. Individual anode elements 30*a*, 30*b*, 32*a*, and 32*b* each comprise a group of parallel conductive strips 34 deposited on the surface of a dielectric sheet 15, i.e., anode element 30*b* comprises a plurality of parallel conductive strips 34 which are separated by spaces 35. Typically, the width of the strips 34 is equal to the width of the spaces 35. The strips 34 in each element are electrically connected in parallel and to ground through a current measuring circuit. The strips on one side of the dielectric sheet 15 (i.e., strips 36 of the element 32*b*) are disposed opposite the spaces between the strips of the element on the opposite side of the array (i.e., spaces 35 between the strips 34 of element 30*b*). The capacitance between the elements on opposite sides of the dielectric sheet is thereby substantially reduced. In a typical array, each strip is approximately 0.25 mm wide, approximately 2.5 cm long and may be produced by a screen printing or etching process.

Figure 5:
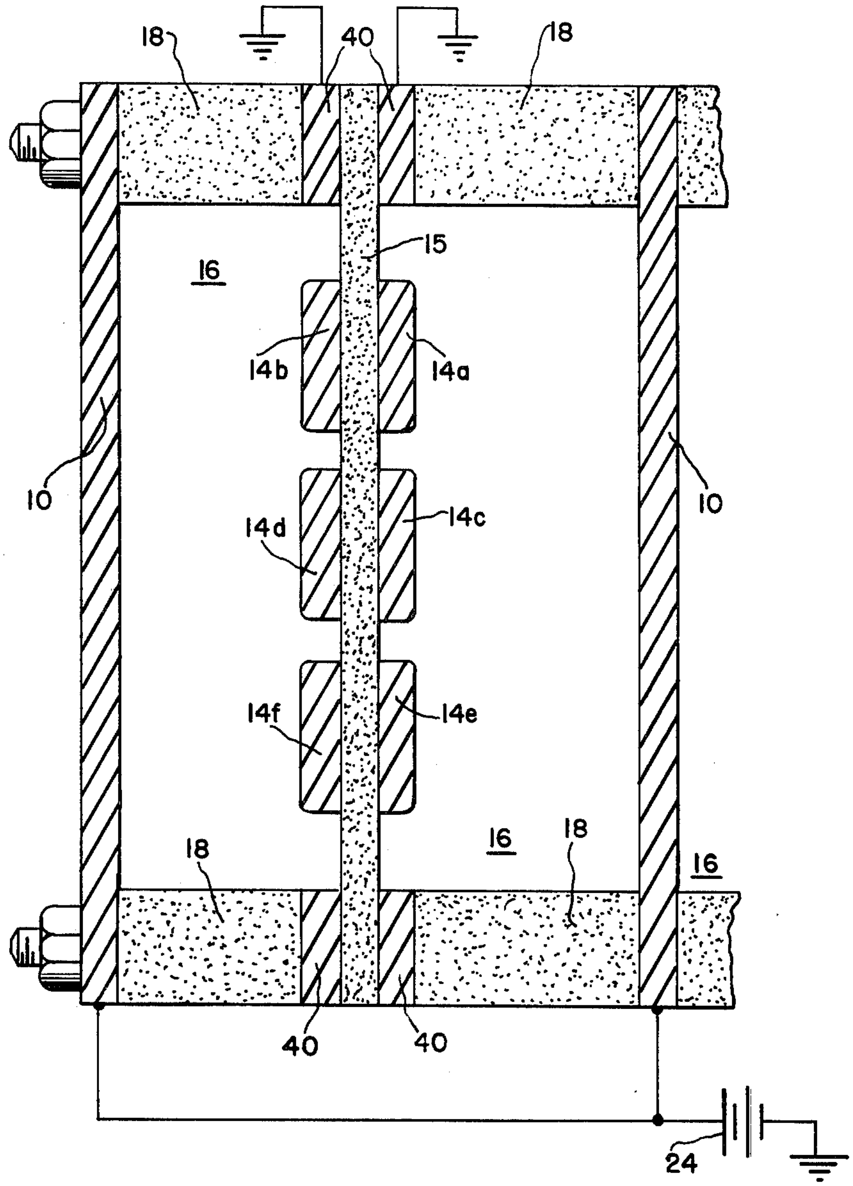
FIG. 5 is an alternate embodiment of the ionization chamber array of FIG. 1.

The guard rings 22 (FIG. 1) need not be formed as separate structures within the detector array. FIG. 5 is an alternate embodiment of a detector array wherein guard electrodes 40 are disposed on the surface of the dielectric sheets 15, adjacent the insulators 18. Thus, the guard electrodes 40 may, if desired, be disposed on the dielectric sheet 15 in the same manner as the anode elements 14*a*-*14f*.

The detector arrays of the present invention allow the rapid recording of x-ray transmission data in a plurality of parallel planes and thus permit high speed, high resolution tomographic examinations. The array contains a relatively small number of individual components which may be contained in a single pressure vessel to provide a compact structure which may be easily aligned in x-ray equipment.

While the invention has been described in detail herein in accord with certain preferred embodiments thereof, many modifications and changes therein may be effected by those skilled in the art. Accordingly, it is intended by the appended claims to cover all such modifications and changes that fall within the true spirit and scope of the invention.

The invention claimed is:

1. In an x-ray detector array of the type comprising a gaseous medium characterized as being substantially opaque to electromagnetic radiation at x-ray frequencies; a plurality of substantially planar cathodes disposed in said gaseous medium; a plurality of substantially planar anode assemblies disposed in said gaseous medium, each of said anode assemblies lying approximately equi-distant between two of said cathodes, and means for applying electric potential between said cathodes and said anode assemblies; the improvement wherein:

each of said anode assemblies comprises a plurality of parallel conductive strips disposed on one or more surfaces of a planar dielectric sheet, the long dimension of each of said strips being oriented substantially parallel to an incident x-ray beam.

2. The array of claim 1 wherein the planes of adjacent anode assemblies are substantially parallel.

3. The array of claim 1 wherein each of said cathodes comprise material which is substantially opaque to electromagnetic radiation at x-ray frequencies.

4. The array of claim 1 wherein the conductive strips in said anode assemblies are disposed in a plurality of measurement planes lying substantially parallel to said incident x-ray beam and perpendicular to said dielectric sheets.

5. The array of claim 4 wherein at least one of said strips in each of said anode assemblies is disposed in each of said measurement planes.

6. The array of claim 1 wherein said strips are disposed on opposing surfaces of said dielectric sheet.

7. The array of claim 6 wherein each strip of a first surface of said dielectric sheet is disposed opposite a strip on a second surface of said dielectric sheet.

8. The array of claim 6 wherein each of said conductive strips comprises a plurality of conductive segments electrically connected in parallel, each of said segments being spaced from adjacent segments to define a plurality of gaps therebetween.

9. The array of claim 8 wherein the segments on a first side of said dielectric sheet are disposed opposite the gaps of a second side of said dielectric sheet.

10. The array of claim 1 wherein each of said conductive strips is electrically insulated from adjacent conductive strips and further comprising means for separately measuring current flow from each of said conductive strips to said means for applying electric potential.

11. The array of claim 10 wherein said means for applying electric potential is adapted to operate said detector array in the ionization chamber mode.

12. The array of claim 10 wherein the magnitude of said electric potential is less than the magnitude of electric potential which will cause or maintain an avalanche multiplication in said gaseous medium.

13. The array of claim 10 wherein said means for measuring current function to maintain said conductive strips at substantially ground potential.

14. The array of claim 13 wherein said means for applying electric potential is a voltage source connected from said cathodes to ground potential.

15. The array of claim 1 wherein said gaseous medium comprises elements having an atomic weight greater than or equal to the atomic weight of argon and wherein the pressure of said gaseous medium is between approximately 10 atmospheres and approximately 100 atmospheres.

16. The array of claim 15 wherein said gaseous medium comprises xenon.

17. The array of claim 1 wherein said cathodes comprise metals selected from the group consisting of molybdenum, tantalum, and tungsten.

18. The array of claim 1 further comprising grounded guard electrodes disposed on the surfaces of said dielectric sheets and insulating means disposed between each of said guard electrodes and an adjacent cathode.

* * * * *